Nov. 13, 1928.

1,691,597

O. M. WHITE

STONE HAULING DEVICE

Filed Sept. 3, 1927

Inventor
O. M. White,

By Clarence A. O'Brien
Attorney

Patented Nov. 13, 1928.

1,691,597

UNITED STATES PATENT OFFICE.

OLE M. WHITE, OF CLEAR LAKE, WISCONSIN.

STONE-HAULING DEVICE.

Application filed September 3, 1927. Serial No. 217,515.

The object of my said invention is the provision of a simple, durable, and easily manipulated device through the medium of which large stones on a field may be moved with facility to a central pile.

To the attainment of the foregoing the invention consists in the improvement as hereinafter described and definitely claimed.

In the accompanying drawings forming part of this specification:

Similar numerals of reference designate corresponding parts in both views of the drawings.

Figure 1:
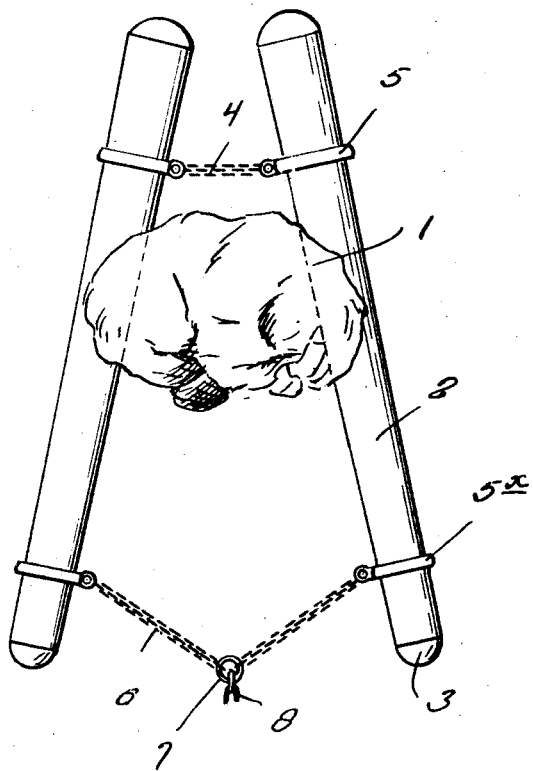
Figure 1 is a plan view illustrating the preferred embodiment of my invention which has been reduced to actual practice, the view showing the device in proper relation to a large stone to be moved through the medium of the device.

In Figure 1 of the drawings I show a large stone, designated by 1, such as are to be found frequently in large numbers on a field, and which it is desirable to move to a pile located in the center of the field or at any other point of the field.

Figure 2:
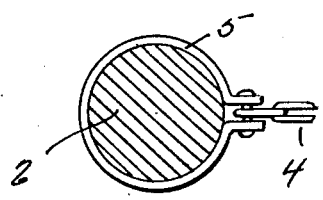
Figure 2 is a transverse section on an enlarged scale taken through one of the log-like members of the device and illustrating the manner in which the cables are connected to the said member.

I also show in Figure 1 the arrangement of my novel device relative to the stone to be moved, while in Figure 2 is disclosed the mode in which I prefer to connect the cables to the major members of the device.

The major members of my novel device are designated by 2 and are of circular cross section and are for such reason referred to as log-like in character. It will also be noted that the members 2 which are preferably of wood, are tapered forwardly and are provided with rounded ends designated by 3, the latter being designed to facilitate the movement of the members 2 flat-wise over the ground. It will also be noted in this connection that if the end of either of the members 2 encounters an obstruction in its path, the said members by virtue of the rounded end will be likely to ride past the obstruction without serious interference.

In addition to the major members 2, my novel device comprises a flexible connection 4, interposed directly between and permanently connecting the rear portions of the members 2. The said flexible connection 4 is preferably, though not necessarily a chain section, and while it may, within the purview of my invention, be connected at its ends to the members 2 in any appropriate manner, I prefer to employ for the purpose clips 5 of metal which embrace the rear portions of the members 2 and are tightly secured thereon and have their end portions arranged inwardly or in confronting relation for the convenient connection of the chain ends, as best shown in Figure 2. Clips similar to the clip 5 and designated by 5× are tightly secured on the forward portions of the members 2, and the said clips 5× serve for the connection of chain sections 6 which, in turn, are connected to a ring 7 or to any other means through the medium of which a draft cable 8, preferably a chain, may be connected with the members 2.

In the practical use of my novel device, the same may be drawn over a field by a draft animal or animals or by one or more men as may be deemed desirable.

In the practical use of my device, the members 2 are arranged as illustrated in Figure 1 relative to a stone to be moved, and so that the lower portion of the stone is between the rear portions of the members 2 and the stone bears on said members 2 slightly in advance of the flexible connection 4. It will be noticed that when the members 2 are arranged as indicated relative to the stone 1, the members 2 will be forwardly divergent and therefore when draft is imposed on the cable 8, the pull exerted on the members 2 adjacent to the forward portion thereof will operate to clamp or bind the members 2 against opposite sides of the stone so that the stone will be securely clamped in the device, and therefore when the device is drawn forwardly, there will be no liability of the stone being casually released from between the members 2. Manifestly, the circular cross section of the members 2 will lend itself to the positioning of the members 2 below opposite portions of the stone when pull is exerted on the forward portion of the members 2.

It will be apparent from the foregoing that my novel device may be adjusted and used with facility; also, that the members 2 may be expeditiously and easily disengaged from a stone at the point of deposit, and that the flexible connections interposed between the members 2 are practically advantageous inasmuch as they lend themselves to compact storage of the device when the same is not in use.

I have explicitly described the preferred embodiment of my invention in order to impart an exact understanding of the said embodiment in all respects. I do not desire, however, to be understood as limitng myself to the precise construction disclosed, my invention being defined by my appended claim within the scope of which modifications may be made without departure from my invention.

Having thus described the invention, what I claim as new and desire to secure by Letters Patent is:—

A stone hauling device comprising major members of circular cross section rounded at their ends and tapered from their rear rounded ends to their forward rounded ends, a flexible connection interposed directly between and connected to the rear portion of the said major members, a flexible connection interposed between and directly connected to the forward portion of the said major members, and draft means connected to said flexible connection.

In testimony whereof I affix my signature.

OLE M. WHITE.